Sept. 9, 1930.  J. A. BURGER  1,775,448
ANGLE SHEARING MACHINE
Filed Aug. 24, 1929
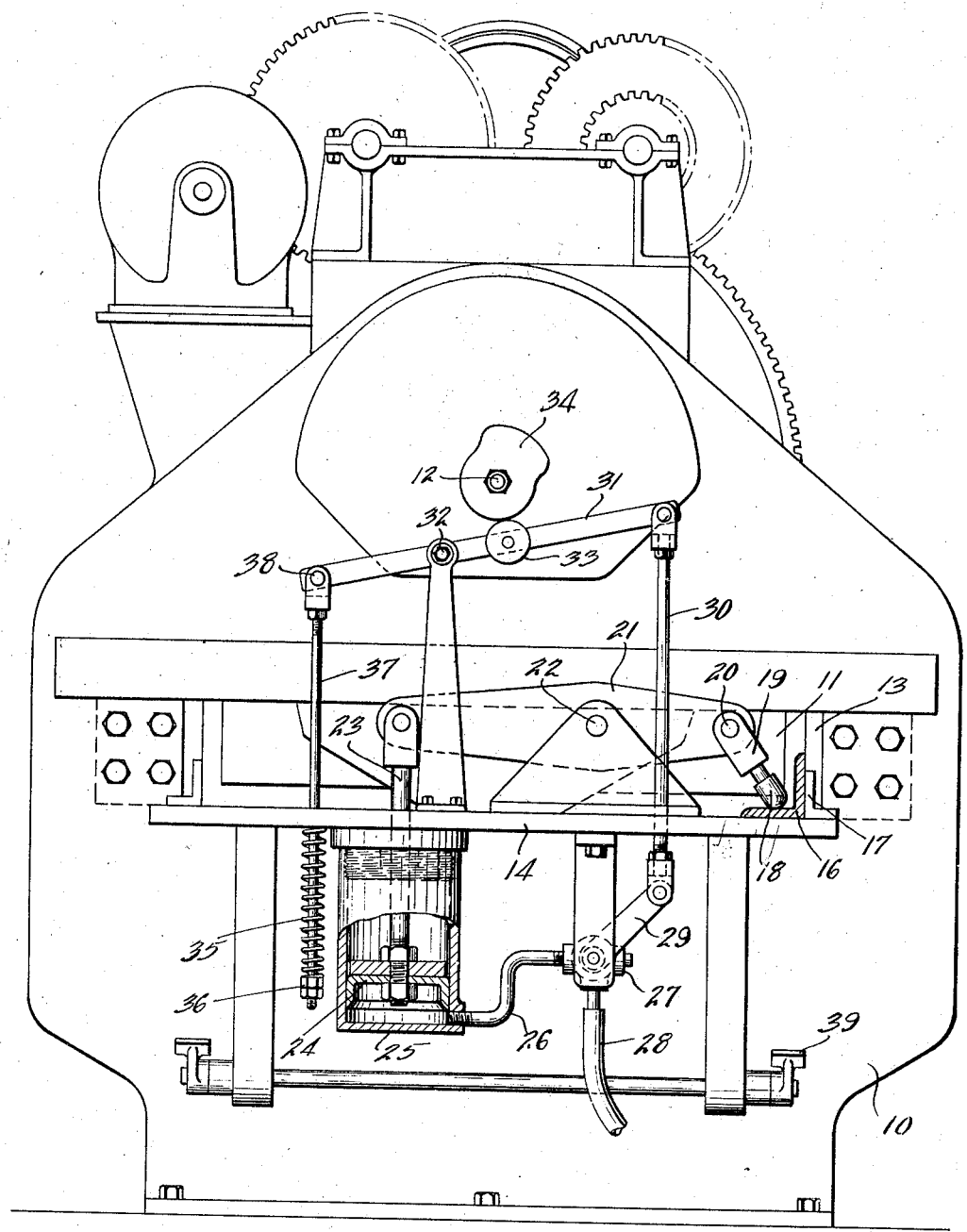
INVENTOR
JOSEPH A. BURGER.
BY
Ely & Barrow
ATTORNEYS Patented Sept. 9, 1930

1,775,448

UNITED STATES PATENT OFFICE

JOSEPH A. BURGER, OF HARTVILLE, OHIO

ANGLE-SHEARING MACHINE

Application filed August 24, 1929. Serial No. 388,078.

This invention relates to angle shearing machines and particularly to work-clamping devices therefor.

Heretofore, angle shears in use commercially have been provided with manually operable work clamps usually screw operated. These clamps are not entirely satisfactory, mainly because they require too much time to clamp the work between shearing operations, the loss in time when angle bars are being sheared to small lengths being particularly disadvantageous.

The general purpose of the invention is to provide an angle bar clamping device in combination with angle bar shears which will be automatic in operation and requires no thought or effort of the workman to clamp the work, the clamp being operable by the shearing machine and functioning as rapidly as said machine can be operated intermittently in cutting angle bars to any lengths.

The foregoing and other purposes of the invention are attained in the shearing machine shown in the accompanying drawing and described below. It is to be understood that the invention is not limited to the specific form thereof shown and described.

The accompanying drawing illustrates the front end of an angle bar shearing machine embodying the invention.

Referring to the drawing, the numeral 10 designates an angle bar shearing machine of a known type in which a movable shear blade 11 is operable by suitable means (not shown) on a shaft 12 to and from shearing cooperation with a fixed shear member 13. A work-supporting plate 14 is provided in such machines to support an angle bar indicated in section at 16 in proper relation to the fixed shear member 13.

In accordance with the present invention a work-holding abutment 17 is provided on plate 14 and is aligned with the fixed shearing member of the machine as shown, the improved clamping mechanism cooperating with said abutment to hold the work in proper position for each shearing operation.

The improved clamping means preferably comprises a clamping element 18, the end of which is rounded or semi-spherical shape as shown and which is supported on the end of a thrust arm 19 freely pivoted at 20 on a lever 21 so that the clamping element 18 rides on the plate 14 and when work 16 is inserted into the machine will ride up onto the surface thereof substantially into the cooperative relation therewith shown in the drawing.

Lever 21 may be pivoted at 22 and may be arranged to be actuated by a piston rod 23 hingedly connected to the lever and having a piston 24 thereon reciprocable in a fluid pressure cylinder 25 in which it may be pneumatically operable. Connection of a source of fluid under pressure to said cylinder in back of the piston may be provided by a conduit 26 leading from a suitable valve 27 to which a supply line 28 may be connected. Valve 27 may be of any well-known design operable between positions respectively to connect the pressure in supply line 28 to the cylinder 25 and to disconnect said cylinder from the line and relieve the pressure in the cylinder.

Control of valve 27 is arranged for by the provision of an arm 29 thereon connected by a link 30 to a lever 31, which lever 31 is pivoted at 32 on the shearing machine and has a roller 33 thereon engaged with a cam 34 secured on the front end of the shaft 12, the roller 33 being held in engagement with the cam 34 by means of a compression spring 35 which may be mounted between adjustable nuts 36 on a rod 37 hingedly connected to lever 31 at 38 and the under side of the plate 14, rod 37 being extended down through said plate.

Machines of this type are operable by a foot pedal 39 to cause a single rotation of shaft 12 for each operation of the shear blade 11. The cam 34 is so designed and is so placed on shaft 12 as to depress lever 31 to actuate valve 27 so as to connect pressure into cylinder 25 as the blade 11 moves into cooperation with the shear member 13, whereby clamp 11 will be actuated just in advance of the shearing.

In operation, when the foot pedal 39 is depressed, rotation of shaft 12 actuates shear blade 11 toward the work which has been run between the shears the required distance as determined by a gage or the like (not shown) at the rear of the machine. Before the shear blade engages the work, however, the cam 34 actuates the mechanism shown to connect supply line 28 to the cylinder 25 and the piston 24 acting through rod 23, lever 21 and thrust arm 19 forces the clamping element 18 into the vertex of angle bar clamping the latter tightly against the abutment 17.

It will appear that the clamping means in no way limits the capacity of the machine, it being operable automatically by the machine as fast as the work can be slid the proper distance through the shear to obtain the desired lengths. Obviously modifications of the invention may be resorted to without departing from the spirit thereof or the scope of the appended claims.

What is claimed is:—

1. The combination with an angle bar shearing machine including relatively movable cooperating shearing members, means for relatively moving said members including a shaft, a support for holding the work in proper relation to said members, and means for actuating the shearing members from said shaft at will, of a clamping means associated with said shearing machine, said clamping means including an abutment against which one side of the work on said support may rest, and a clamping element operable over the support into the vertex of the work to hold the work against said abutment, said clamping element having a rounded work-engaging end, a lever for actuating said element, a thrust member freely pivoted on said lever and carrying said element on the free end thereof, fluid pressure means for actuating said lever, a valve controlling said means, a lever for actuating the valve, a cam on said shaft for actuating the lever, and yielding means acting on the lever for holding the lever against the cam.

2. The combination with an angle bar shearing machine including relatively movable cooperating shearing members, means for relatively moving said members including a shaft, a support for holding the work in proper relation to said members, and means for actuating the shearing members from said shaft at will, of a clamping means associated with said shearing machine, said clamping means including an abutment against which one side of the work on said support may rest, and a clamping element operable over the support into the vertex of the work to hold the work against said abutment, a lever for actuating said element, a thrust member freely pivoted on said lever and carrying said element on the free end thereof, fluid pressure means for actuating said lever, a valve controlling said means, a lever for actuating the valve, a cam on said shaft for actuating the lever, and yielding means acting on the lever for holding the lever against the cam.

3. The combination with an angle bar shearing machine including relatively movable cooperating shearing members, means for relatively moving said members including a shaft, a support for holding the work in proper relation to said members, and means for actuating the shearing members from said shaft at will, of a clamping means associated with said shearing machine, said clamping means including an abutment against which one side of the work on said support may rest, a clamping element operable over the support into the vertex of the work to hold the work against said abutment, said clamping element having a rounded work-engaging end resting freely on said support and adapted to ride over the work, fluid pressure means for actuating said element, and means operable by said shaft to control operation of said fluid pressure means.

4. The combination with an angle bar shearing machine including relatively movable cooperating shearing members, means for relatively moving said members including a shaft, a support for holding the work in proper relation to said members, and means for actuating the shearing members from said shaft at will, of a clamping means associated with said shearing machine, said clamping means including an abutment against which one side of the work on said support may rest, a clamping element operable over the support into the vertex of the work to hold the work against said abutment, fluid pressure means for actuating said element, and means operable by said shaft to control operation of said fluid pressure means.

5. The combination with an angle bar shearing machine including relatively movable cooperating shearing members, means for relatively moving said members including a shaft, a support for holding the work in proper relation to said members, and means for actuating the shearing members from said shaft at will, of a clamping means associated with said shearing machine, said clamping means including an abutment against which one side of the work on said support may rest, a clamping element operable over the support into the vertex of the work to hold the work against said abutment, means for actuating said element, and means operable by said shaft to control operation of said means.

6. The combination with an angle bar shear comprising relatively movable shear members operable at will, means for relatively moving said members, a support for holding work extended between said shear members, an abutment associated with said support whereby an angle bar may be supported with one face on the support and the other face against the abutment, a clamp operable over the support into the vertex of the angle bar to clamp it on the support against the abutment, and means operable by said shear moving means for actuating the clamp in advance of movement of the shears into cooperation with the work.

JOSEPH A. BURGER.